United States Patent
Ausseresse

(10) Patent No.: US 9,843,257 B2
(45) Date of Patent: Dec. 12, 2017

(54) SET POINT INDEPENDENT REGULATION OF A SWITCHED MODE POWER CONVERTER

(71) Applicant: Infineon Technologies Austria AG, Villach (AT)

(72) Inventor: Pierrick Ausseresse, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/424,071

(22) Filed: Feb. 3, 2017

(65) Prior Publication Data
US 2017/0229959 A1   Aug. 10, 2017

Related U.S. Application Data

(60) Provisional application No. 62/291,910, filed on Feb. 5, 2016.

(51) Int. Cl.
*H02M 3/157* (2006.01)
*H02M 1/08* (2006.01)

(52) U.S. Cl.
CPC ............. *H02M 3/157* (2013.01); *H02M 1/08* (2013.01)

(58) Field of Classification Search
CPC .................................. H02M 3/157; H02M 1/08
See application file for complete search history.

(56) References Cited

U.S. PATENT DOCUMENTS

| 7,180,439 B1* | 2/2007 | Bakker | H02M 7/529 341/141 |
| 2007/0069706 A1* | 3/2007 | Chapuis | H02M 3/157 323/283 |
| 2015/0137785 A1* | 5/2015 | Stevens | H02M 3/157 323/283 |

* cited by examiner

*Primary Examiner* — Emily P Pham
(74) *Attorney, Agent, or Firm* — Shumaker & Sieffert, P.A.

(57) ABSTRACT

A controller for controlling a power converter includes an analog-to-digital converter (ADC) configured to output, based on a received analog voltage, a first digital value defined by a first resolution. The controller also includes a digital filter configured to adjust, based at least in part on the first digital value, a second digital value, wherein the second digital value is defined by a second resolution different from the first resolution. The controller further includes a pulse modulation device configured to output, based on a sum of the first digital value and the second digital value, a pulse modulated signal, wherein a frequency of the pulse modulated signal is defined by the second resolution.

20 Claims, 6 Drawing Sheets

SET POINT INDEPENDENT REGULATION OF A SWITCHED MODE POWER CONVERTER

The application claims the benefit of U.S. Provisional Application No. 62/291,910, filed Feb. 5, 2016, the entire contents of which is incorporated by reference herein.

TECHNICAL FIELD

This disclosure relates to power converters, and more particular, to techniques and circuits associated with switched-mode power converters.

BACKGROUND

Some circuits may use power converters that receive a power input from a power source and convert the power input to a power output that has a different (e.g., regulated) voltage or current level than the voltage or current level of the power input. The converter outputs the power for powering a component, a circuit, or other electrical device. Switch-based power converters may use half-bridge circuits and signal modulation techniques to regulate the current or voltage level of a power output. In some examples, power converters may use feedback control circuits and techniques (e.g., voltage sensing, current sensing, and the like) to improve the accuracy and control of the voltage or current level of the power output. These aforementioned techniques and circuits for improving the accuracy and control of the voltage or current of the power output may decrease overall efficiency of the power converter and/or increase the physical size, complexity, and/or cost of the power converter.

SUMMARY

In one example, a controller for controlling a power converter includes an analog-to-digital converter (ADC) configured to output, based on a received analog voltage, a first digital value defined by a first resolution. The controller also includes a digital filter configured to adjust, based at least in part on the first digital value, a second digital value, wherein the second digital value is defined by a second resolution different from the first resolution. The controller also includes a pulse modulation device configured to output, based on a sum of the first digital value and the second digital value, a pulse modulated signal, wherein a frequency of the pulse modulated signal is defined by the second resolution.

In another example, a method for controlling a power converter includes receiving, by an analog-to-digital converter (ADC), an analog voltage; and outputting, by the ADC, a first digital value defined by a first resolution. The method also includes adjusting, by a digital filter, based at least in part on the first digital value, a second digital value, wherein the second digital value is defined by a second resolution different from the first resolution; and outputting, by the digital filter, the second digital value. The method further includes outputting, by a pulse modulation device, based on a sum of the first digital value and the second digital value, a pulse modulated signal, wherein a frequency of the pulse modulated signal is defined by the second resolution.

In another example, a system may include a power converter configured to regulate an output voltage and a controller configured to control the power converter. The controller includes an analog-to-digital converter (ADC) configured to output, based on a received analog voltage, a first digital value defined by a first resolution. The controller includes a digital filter configured to adjust, based at least in part on the first digital value, a second digital value, wherein the second digital value is defined by a second resolution different from the first resolution. The controller also includes a pulse modulation device configured to output, based on a sum of the first digital value and the second digital value, a pulse modulated signal, wherein a frequency of the pulse modulated signal is defined by the second resolution. The power converter is configured to regulate the output voltage based on the pulse modulated signal output by the pulse modulation device.

The details of one or more examples are set forth in the accompanying drawings and the description below. Other features, objects, and advantages of the disclosure will be apparent from the description and drawings, and from the claims.

DETAILED DESCRIPTION

The disclosure describes techniques for improving the resolution of the power output by the power converter. A power converter may be controlled by a controller, which may receive a feedback voltage based on the voltage output by the power converter. The controller may convert the feedback voltage to a digital value indicative of the feedback voltage using an analog-to-digital controller (ADC). The digital value output by the ADC may be defined by a first resolution. A digital filter may be coupled to the ADC and may output a filtered digital value defined by a second resolution. A pulse modulation device may output a pulse modulated signal based on a sum of the digital value output by the ADC and the filtered digital value output by the digital filter. The pulse modulated signal may be defined by the second resolution. The resolution of the filtered digital value may be greater than the resolution of the ADC. Accordingly, the digital filter may enable the pulse modulation device to provide more refined control of the pulse modulated signal. By refining the control of the pulse modulated signal, the controller may provide more refined control of the voltage output by the power converter.

Additionally or alternatively, by outputting a filtered digital value, the digital filter may regulate the digital value output by the ADC. For example, the controller may operate in a closed loop system. The controller may receive a feedback voltage that indicates whether the voltage output by the power converter is too high or too low. The ADC outputs a digital value indicative of the feedback voltage and the digital filter may adjust the value received by the pulse modulation device. The digital filter may adjust the filtered digital value in order to cause the feedback voltage received by the ADC to be at 50% of the ADC range. Because the digital filter may cause the feedback voltage to be at 50% of the ADC range, the digital value output by the ADC may appear to be independent of the set point voltage.

Figure 1:
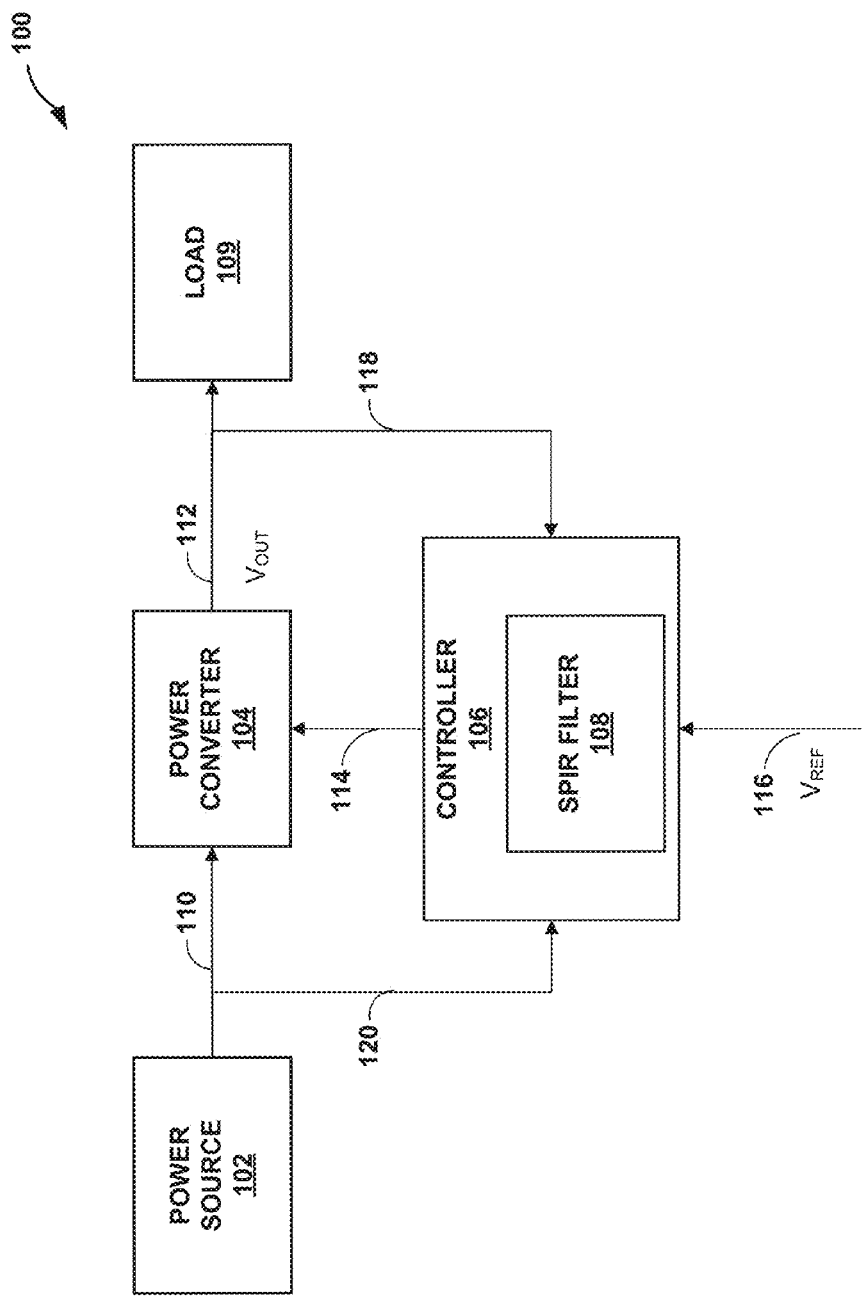
FIG. 1 is a block diagram illustrating an example system for converting power from a power source, in accordance with one or more aspects of this disclosure.

FIG. 1 is a block diagram illustrating a system 100 for converting power from power source 102, in accordance with one or more aspects of this disclosure. FIG. 1 shows system 100 as having four separate and distinct components shown as power source 102, power converter 104, controller 106, and load 109, however system 100 may include additional or fewer components. For instance, power source 102, power converter 104, controller 106, and load 109 may be four individual components or may represent a combination of one or more components that provide the functionality of system 100 as described herein.

System 100 may include power source 102 which provides electrical power to load 109. Numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to system 100.

System 100 includes power converter 104 which operates as a switched-mode power supply that converts one form of electrical power provided by power source 102 into a different, and usable form, of electrical power for powering load 109. For example, power converter 104 may receive a power input and convert the power input to a power output that has a voltage or current level that is different (e.g., regulated) than the voltage or current level of the power input. Power converter 104 may include an LLC power converter including at least two inductors (or a transformer which integrates the two inductors in one mechanical element) and at least one capacitor. Power converter 104 may be a step-up converter that outputs power with a higher voltage level (or current level) than the voltage level (or current level) of input power received by the step-up converter. One example of such step-up converter may be referred to as a boost converter. Power converter 104 may instead comprise a step-down converter configured to output power with a lower voltage level (or current level) than the voltage level (or current level) of input power received by the step-down converter. One example of such a step-down converter may be referred to as a buck converter. In still other examples, power converter 104 may be a step-up and step-down converter (e.g., a buck-boost converter) that is capable of outputting power with a voltage level that is higher or lower level than the voltage level of the power input received by the step-up and step-down converter. Examples of power converter 104 may include battery chargers, microprocessor power supplies, and the like. Generally, the systems and methods described herein may be applied to an AC-to-DC converter, DC-to-DC converter, or DC-to-AC converter.

Power converter 104 may include one or more switches (e.g., MOS transistor based switches, gallium nitride (GaN) based switches, or other types of switch devices) arranged in a power stage configuration (e.g., a single phase, or multi-phase half-bridge configuration, etc.) that power converter 104 controls, according to one or more modulation techniques, to change the current or voltage level of the power output. A single phase half-bridge may include a high-side switch coupled to a low-side switch at a switching node whereas a multi-phase half-bridge may include multiple high-side switches coupled to multiple low-side switches at a switching node.

Power converter 104 may include one or more gate drivers and control logic to control (e.g., turn-on and turn-off) the one or more switches of the power stage using modulation techniques. The modulation of the switches of a power stage may operate according to pulse density modulation (PDM), pulse width modulation (PWM), pulse frequency modulation (PFM), or another suitable modulation technique. In PWM, the width (i.e., duration) of the pulse is modulated based on a modulator signal. In PDM, the relative density of a pulse corresponds to an analog signal's amplitude. By controlling the switches of a power stage using modulation techniques, a power converter can regulate the current or voltage level of the power being outputted by the power converter. In PFM, the frequency of a pulse train is varied based on the instantaneous amplitude of the modulating signal at sampling intervals.

System 100 further includes controller 106 and load 109. Load 109 receives the electrical power (e.g., voltage, current, etc.) converted by power converter 104. Numerous examples of load 109 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 102 may provide electrical power with a first voltage or current level over link 110. Load 109 may receive electrical power that has a second voltage or current level over link 112, converted by power converter 104, and regulated by controller 106, over link 114. Links 110, 112, 114, 116, 118, and 120 represent any medium capable of conducting electrical power from one location to another. Examples of links 110, 112, 114, 116, 118, and 120 include, but are not limited to, physical and/or wireless electrical transmission mediums such as electrical wires, electrical traces, conductive gas tubes, twisted wire pairs, and the like. Each of links 110 and 112 provide electrical coupling between, respectively, power source 102 and power converter 104, and power converter 104 and load 109. Link 114 provides electrical coupling between controller 106 and power converter 104, such that controller 106 may send commands to power converter 104 in order to regulate the power output of power converter 104 that is delivered to load 109. In addition, link 118 provides a feedback loop or circuit for carrying information to controller 106 associated with the characteristics of the power output from power converter 104.

In the example of system 100, electrical power delivered by power source 102 may be converted by power converter 104 to power that has a regulated voltage and/or current level that meets the power requirements of load 109. For instance, power source 102 may output, and power converter 104 may receive, power which has a first voltage level at link 110. Power converter 104 may convert the power which has the first voltage level to power which has a second voltage level that is required by load 109. Power converter 104 may output the power that has the second voltage level at link 112. Load 109 may receive the power that has the second voltage level at link 112. Load 109 may use the power having the second voltage level to perform a function (e.g., power a microprocessor).

Controller 106 of system 100 may be coupled to power source 102 via link 120, the output of power converter 104 via link 118, and may receive an input at link 116. Controller 106 is further coupled to power converter 104 via link 114 to send signals or commands to power converter 104 for controlling various operations of power converter 104. For example, controller 106 may send a pulse modulated signal to power converter 104 to cause power converter 104 output a different voltage or current level that fits within a voltage or current level tolerance window required by load 109.

In some examples, controller 106 may receive an electrical signal, such as output voltage $V_{OUT}$ or an output current, from power converter 104 and may output a pulse modulated signal based on the received electrical signal (e.g., output voltage $V_{OUT}$). For instance, controller 106 may determine a difference between output voltage $V_{OUT}$ (or an output current) from power converter 104 and a nominal output voltage (or current), where the difference may also be referred to as an error amount. Controller 106 may determine a feedback voltage based on the error amount.

In some examples, controller 106 may include an N-bit analog to digital converter (ADC) which may convert the feedback voltage to a digital value indicative of the feedback voltage. In other words, the ADC of controller 106 may receive an analog feedback voltage and may output a digital value indicative of the feedback voltage. For an N-bit ADC, the digital value may be between zero and $2^N-1$, where N is any positive integer. The resolution of the digital value output by the ADC may be defined by the number of distinct values that may be output by the ADC. In other words, for an N-bit ADC, the resolution of the digital value output by the ADC equals $2^N$.

Controller 106 may include a pulse modulation device and may output a pulse modulated signal based at least in part on the digital value output by the ADC. The resolution of the pulse modulated signal output by the pulse modulation device may be defined by the number of distinct signals that may be output by the pulse modulation device. In some examples, the resolution of the ADC may be different than the resolution of the pulse modulation device. For example, the pulse modulation device may be capable of outputting a pulse modulated signal with a resolution greater than the resolution of the ADC. For instance, the pulse modulation device may be capable of outputting a pulse modulated signal at 2048 distinct frequencies while the ADC may only be capable of outputting 256 distinct values (e.g., if the ADC is an 8-bit ADC). It should be understood that the resolutions described herein are examples resolutions and that the resolution of the ADC and/or the resolution of the pulse modulation device may be different than the examples described herein.

Controller 106 includes a digital filter. In some examples, the digital filter may include a gain to increase the digital value output by the ADC to a value that may be received by the pulse modulation device. For example, the digital filter may multiply the digital value output by the ADC by the gain factor (e.g., a gain factor of 8) to generate an updated digital value, and may output the updated digital value to the pulse modulation device. For instance, if the digital value output by the ADC equals 0 and the digital filter multiplies the digital value by 8, the value received by the pulse modulation device is also 0. Similarly, if the digital value output by the ADC equals 1 and the digital filter multiplies the digital value by 8, the value received by the pulse modulation device is 8. Likewise, if the digital value output by the ADC equals 255 and the digital filter multiplies the digital value by 8, the value received by the pulse modulation device is 2040. However, in these examples, if the pulse modulation device is capable of outputting 2048 distinct frequencies but only receives values 0, 8, 16, and so on to 2040, the extra resolution of the pulse modulation device may go unused. In other words, in some examples, the pulse modulation frequencies associated with input values of 1-7, 9-15, and so on may go unused. It may be desirable to output a pulse modulated signal with a resolution that is higher than the resolution of the ADC. In some examples, a higher resolution may be possible by oversampling the ADC. However, oversampling may cause an undesirable phase lag.

In accordance with the techniques of this disclosure, controller 106 includes set point independent regulation (SPIR) filter 108. SPIR filter 108 may enable controller 106 to increase the resolution of the pulse modulated signal output by controller 106. For example, the ADC may output a digital value defined by a first resolution and the pulse modulation device may output a pulse modulation signal defined by a second resolution that is different from the first resolution. STIR filer 108 may receive an indication of the digital value output by the ADC (e.g., via a bit adder) and may output a digital value defined by the second resolution. For instance, if the ADC is an 8-bit ADC such that the ADC may output 256 ($2^8$) discrete values (i.e., the resolution of the ADC equals 256) and controller 106 is capable of outputting a pulse modulated signal at 2048 distinct frequencies (i.e., the resolution of the pulse modulation device equals 2048), SPIR filter 108 may output, based on the digital value output by the ADC, a digital value defined by the second resolution. Because each distinct frequency of the pulse modulated signal output by the pulse modulation device corresponds to a distinct digital input value received by the pulse modulation device from SPIR filter 108, SPIR filter 108 may enable controller 106 to output a pulse modulated signal at any of the 2048 distinct frequencies.

In some examples, SPIR filter 108 may cause feedback voltage received by the ADC to be at 50% of the ADC range. In other words, if the ADC receives values from 0-5 volts, SPIR filter 108 may cause the feedback voltage received by the ADC to be approximately 2.5 volts. For example, the pulse modulation device may receive the filtered digital value from SPIR filter 108 and may adjust the pulse modulated signal based on the received filtered digital value. Power converter 104 may receive the adjusted pulse modulated signal and may output an updated output voltage $V_{OUT}$. Controller 106 may determine a new feedback voltage based on the updated output voltage $V_{OUT}$, which may cause the feedback voltage to be at 50% of the ADC range. Because the SPIR filter 108 may cause the ADC to operate at 50% of the ADC range regardless of the set point voltage, the ADC may appear to operate independent of the set point voltage.

In this manner, the controller may improve the accuracy of the power output by the power converter. Techniques of this disclosure may enable pulse modulation device to receive an input signal defined by a resolution that is greater than the resolution of an output signal output by an ADC. Improving the resolution of the input signal to the pulse modulation device may enable to pulse modulation device to increase the resolution of the pulse modulated signal. As a result, the controller may provide more refined control of the power converter. Thus, the power output by the power converter may be contained within a tolerance window and may satisfy the voltage or current level associated with the power requirements of the load.

Figure 2:
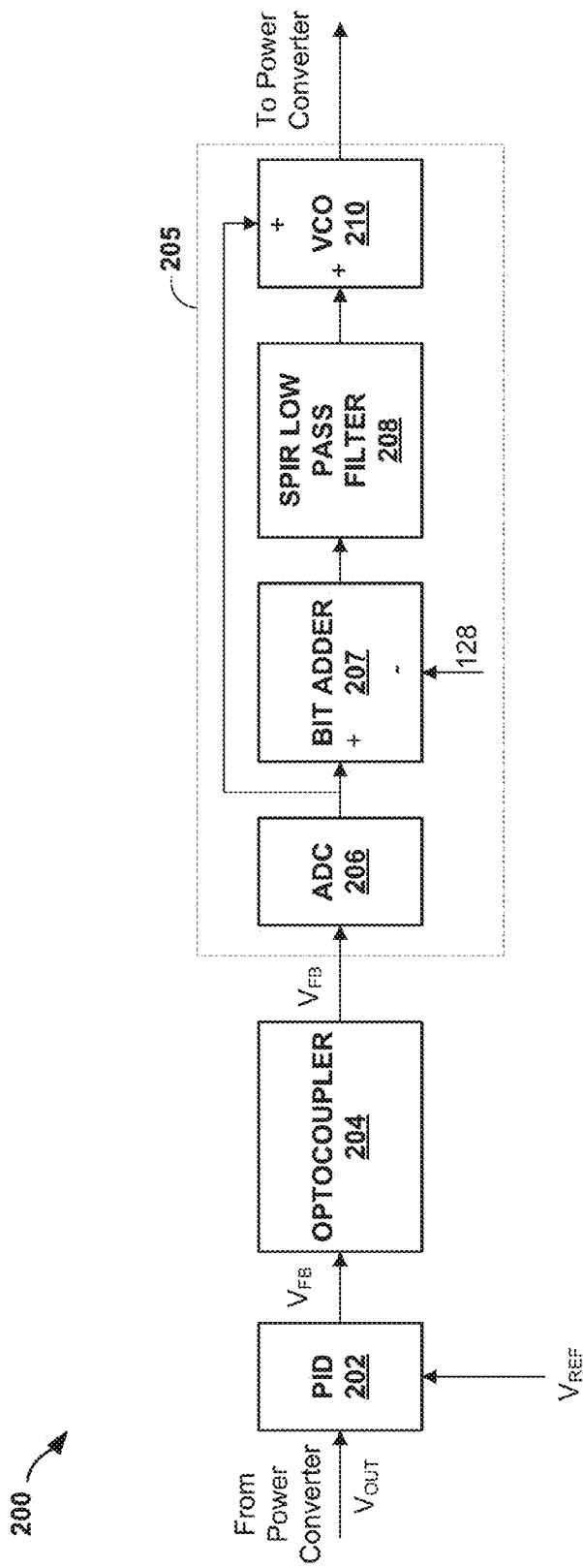
FIG. 2 is a block diagram illustrating an example controller in accordance with one or more aspects of this disclosure.

FIG. 2 is a block diagram illustrating an example of a controller 200 in accordance with one or more aspects of this disclosure. In some examples, controller 200 may correspond to controller 106 of FIG. 1. In some examples, controller 200 may include Proportional-Integral-Derivative (PID) controller 202, optocoupler 204, analog-to-digital converter (ADC) 206, bit adder 207, digital set point independent regulation (SPIR) low-pass filter 208, and voltage controlled oscillator (VCO) 210. FIG. 2 shows controller 200 as having six separate and distinct components, however controller 200 may include additional or fewer components. For instance, in some examples, ADC 206, bit adder 207, SPIR filter 208, and VCO 210 may be part of a controller (e.g., an integrated circuit (IC) 205) that is separate from PID controller 202 and optocoupler 204.

PID controller 202 may output a feedback voltage based on a difference between the output voltage $V_{OUT}$ from a power converter (e.g., power converter 104 of FIG. 1) and a nominal, or reference voltage, $V_{REF}$. The difference between output voltage $V_{OUT}$ and reference voltage $V_{REF}$ is also referred to as an error amount. PID controller 202 may determine the error amount or may receive an indication of the error amount from an error calculation device (e.g., error calculation device 512 of FIG. 5). Regardless, PID controller 202 may output a feedback voltage $V_{FB}$ based on the voltage error amount. For example, PID controller 202 may use proportional control to output a feedback voltage $V_{FB}$ that is proportional to the error in the voltage. For instance, if PID controller 202 determines the output voltage $V_{OUT}$ is less than the reference voltage $V_{REF}$, PID controller 202 may increase the feedback voltage $V_{FB}$.

In some examples, PID controller 202 may use integral control to output a feedback voltage $V_{FB}$ based on the accumulated error in output voltage $V_{OUT}$. In some examples, PID controller 202 may use derivative control to output a feedback voltage $V_{FB}$ based on the rate of change in the error of the output voltage $V_{OUT}$. For instance, if PID controller 202 determines the output voltage \four is less than the reference voltage $V_{REF}$ and the difference between output voltage $V_{OUT}$ and the reference voltage $V_{REF}$ is increasing, PID controller 202 may increase the feedback voltage $V_{FB}$ to a relatively large voltage to correct $V_{OUT}$. On the other hand, if PID controller 202 determines the output voltage $V_{OUT}$ is less than the reference voltage $V_{REF}$ but that the difference between output voltage $V_{OUT}$ and the reference voltage $V_{REF}$ is decreasing, PID controller 202 may increase the feedback voltage $V_{FB}$ by a relatively small voltage in order to prevent overshooting the set point voltage. In some examples, PID controller 202 may determine a feedback voltage $V_{FB}$ based on proportional control, integral control, derivative control, or any combination thereof.

Optocoupler 204 may be used to isolate the feedback voltage $V_{FB}$ received from PID controller 202 from power converter 104. For instance, optocoupler 204 may receive the feedback voltage from PID controller 202, convert the feedback voltage to light (e.g., by an LED), convert the light back to the feedback voltage (e.g., by a phototransistor), and output the converted feedback voltage $V_{FB}$.

In some examples, ADC 206 may receive the feedback voltage $V_{FB}$ via optocoupler 204. ADC 206 may convert the received feedback voltage $V_{FB}$ from an analog value to a digital value indicative of feedback voltage $V_{FB}$. For instance, if ADC 206 includes an 8-bit ADC, ADC 206 may convert the analog feedback voltage $V_{FB}$ to a digital value defined by a first resolution. The first resolution may include 256 ($2^8$=256) distinct values (e.g., 0 to 255). For instance, if ADC 206 is an 8-bit ADC and includes an input range of 0-5V (e.g., ADC 206 may receive a feedback voltage $V_{FB}$ between 0 and 5 volts) and feedback voltage $V_{FB}$ equals 4.45V, ADC 206 may output a digital value equal to 228.

In some examples, controller 200 may include bit adder 207. Bit adder 207 may include an adder-subtractor configured to output a digital value indicating the difference between two received values. In some examples, may receive a digital value at a positive terminal (also referred to as a non-inverting input) and another digital value at a negative terminal (also referred to as an inverting input). For example, bit adder 207 may receive the digital value from ADC 206 at the positive terminal. At the negative terminal, bit adder 207 may receive a predetermined digital value. The predetermined digital value may be equal to one half of the number of distinct values that can be output by ADC 206. For example, if ADC 206 includes an 8-bit ADC, the number of distinct values that can be output by ADC 206 equals 256 (i.e., the resolution of ADC 206 equals 256), and bit adder 207 may receive a predetermined digital value equal to one half of 256 (i.e., 128) at the negative terminal. In some examples, bit adder 207 may determine the difference between the received digital values. In response to determining the difference between the received digital values, bit adder 207 may output a digital value equal to the difference between the received digital values. Continuing the example above, where ADC 206 outputs a digital value equal to 228, bit adder 207 may determine that the difference between the digital value received from ADC 206 and the predetermined value is equal to 100. Thus, bit adder 207 may output a digital value equal to 100.

In some examples, the digital value output by bit adder 207 indicates whether controller 200 is operating in a steady state. Controller 200 may be in a steady state when ADC 206 operates at one half of the ADC range (e.g., an 8-bit ADC 206 outputs a digital value equal to 128). That is, controller 200 operates in a steady state when the difference between the digital value output by ADC 206 and the predetermined value equals zero. Thus, in some examples, controller 200 is in a steady state when the value output by bit adder 207 equals zero.

Controller 200 may include SPIR low-pass filter 208, which may correspond to SPIR low-pass filter 108 of FIG. 1. In some examples, SPIR low-pass filter 208 includes a low-pass filter that has a gain larger than unity at low frequencies and a unity gain at high frequencies. In other words, SPIR low-pass filter 208 may be defined by a gain larger than unity when a frequency of the pulse modulated signal is less than a first threshold frequency and by a unity gain when the pulse modulated signal is greater than a second threshold frequency. In some instances, the first and second threshold frequency may be the same, however the threshold frequencies may also be different. Including a SPIR low-pass filter 208 has a gain larger than unity at low frequencies and a unity gain at high frequencies may enable the controller to enhance the number of bits available on ADC 206 for low frequencies with minimal or no effect on the performance of ADC 206 at higher frequencies.

SPIR low-pass filter 208 may receive the digital value output by bit adder 207 and may output a filtered digital value defined by a second resolution. For example, SPIR low-pass filter 208 may output a filtered digital value at any of 2048 distinct values. In some examples, SPIR low-pass filter 208 may adjust the filtered digital value based on the digital value output by bit adder 207, which itself is based on the digital value output by ADC 206. For example, SPIR low-pass filter 208 may receive the value output by bit adder 207 and may adjust the filtered digital value in response to determining that the digital value received from bit adder 207 satisfies a first condition or a second condition.

SPIR low-pass filter 208 may adjust (e.g., increase) the filtered digital value when the digital value output by bit adder 207 satisfies a first condition. In some examples, the digital value received from bit adder 207 satisfies a first condition if the value received from bit adder 207 is greater than a threshold value. For example, if the threshold value equals zero and bit adder 207 outputs a value equal to 100, SPIR low-pass filter 208 may determine that the first condition is satisfied and may increase the filtered digital value from a first filtered digital value to a second filtered digital value. SPIR low-pass filter 208 may output the updated filtered digital filtered to VCO 210. By outputting an increased digital value to VCO 210, SPIR low-pass filter 208 may cause VCO 210 to adjust the frequency of the pulse modulated signal from a first frequency to a second frequency. By adjusting the frequency of the pulse modulated signal, VCO 210 may cause power converter 104 to adjust $V_{OUT}$, which may reduce the error amount, which may cause PID controller 202 to reduce the feedback voltage, which may reduce the digital value output by ADC 206. Thus, in some examples, SPIR low-pass filter 208 may increase the filtered digital value until controller 200 is in a steady state and the first condition is no longer satisfied (e.g., until the value received from bit adder 207 is no longer greater than zero).

For example, in a steady state, SPIR, low-pass filter may output a digital value of 400 and ADC 206 may output a digital value equal to 128. Responsive to determining that controller 200 is no longer in a steady state and that the first condition is satisfied (i.e., the value received from bit adder 207 is greater than zero), SPIR low-pass filter 208 may incrementally increase the filtered digital value from 400 to 500, which may cause PID controller 202 to reduce the feedback voltage $V_{FB}$ until the corresponding digital value output by ADC 206 decreases from 228 to 128. When the digital value output by ADC 206 equals 128, bit adder 207 may output a value of zero, such that the first condition is no longer satisfied. Thus, in this example, while the digital value output by ADC 206 started at a value of 228 and the filtered digital value output by SPIR 208 stated at a value of 400, SPIR low-pass filter 208 may cause system 100 to settle to a steady state where the new digital value output by ADC 206 equals 12.8 and the filtered digital value output by ADC 208 equals 500. As a result, SPIR low-pass filter 208 causes ADC 206 to operate at half of the ADC range such that ADC 206 appears to operate independent of the ADC input voltage and the output voltage $V_{OUT}$ output by power converter 104.

Likewise, SPIR low-pass filter 208 may decrease the filtered digital value output by SPIR low-pass filter 108 when the digital value output by bit adder 207 satisfies a second condition. In some examples, the digital value received from bit adder 207 satisfies a second condition if the value received from bit adder 207 is less than a threshold value. For example, if the threshold value equals zero and bit adder 207 outputs a value of −128 (negative 128), SPIR low-pass filter 208 may determine that the second condition is satisfied and may decrease the filtered digital value from a first filtered digital value to a second filtered digital value. SPIR low-pass filter 208 may output the updated filtered digital filtered to VCO 210. By outputting a decreased digital value to VCO 210, SPIR low-pass filter 208 may cause VCO 210 to adjust the frequency of the pulse modulated signal from a first frequency to a second frequency. By adjusting the frequency of the pulse modulated signal, VCO 210 may cause power converter 104 to adjust $V_{OUT}$, which may reduce the error amount in output voltage $V_{OUT}$, which may cause PID controller 202 to increase the feedback voltage, which may increase the digital value output by ADC 206. Thus, in some examples, SPIR low-pass filter 208 may decrease the filtered digital value until controller 200 is in a steady state and the second condition is no longer satisfied (e.g., until the value received from bit adder 207 is no longer less than zero). For example, SPIR low-pass filter 208 may incrementally decrease the filtered digital value from 400 to 300, which may cause PID controller 202 to increase the feedback voltage until the corresponding digital value output by ADC 206 increases from 0 to 128. When the digital value output by ADC 206 equals 128, bit adder 207 may output a value of zero, such that the second condition is no longer satisfied and controller 200 is in a steady state.

In some examples, when controller 200 is operating in a steady state, the digital value output by bit adder 207 equals zero. When SPIR low-pass filter 208 receives a digital value equal to zero, SPIR low-pass filter 208 may determine that neither the first condition is satisfied nor is the second condition satisfied. Thus, SPIR low-pass filter 208 may refrain from adjusting the filtered digital value. For instance, if the filtered digital value equals 400 and neither condition is satisfied, SPIR filter 208 may output a digital value of 400.

Controller 200 may include a pulse modulation device such as VCO 210. VCO 210 may receive a digital value based on the filtered digital value output by SPIR low-pass filter 208 and may output a pulse modulation signal with a frequency that corresponds to the received digital value. In some instances, VCO 210 may receive the unfiltered digital value from ADC 206 and the filtered digital value from SPIR low-pass filter 208 and may sum the unfiltered digital value and the filtered digital value to generate a summed digital value. Alternatively, VCO 210 may receive a sum of the filtered digital value from SPIR low-pass filter 208 and the unfiltered digital value from ADC 206. In some examples, each distinct frequency of VCO 210 may correspond to a distinct summed digital value. In other words, VCO 210 may output a pulse modulated signal defined by the same resolution as the summed digital value. For instance, VCO may receive any of 2048 distinct summed digital values and may output a pulse modulated signal at one of 2048 distinct frequencies, such that the sum of the filtered and unfiltered digital values may correspond to a respective frequency of the pulse modulated signal. For instance, responsive to receiving a filtered digital value 400 from SPIR low-pass filter 208 and an unfiltered digital value of 200 from ADC 206 (i.e., the summed digital value equals 628), VCO 210 may output a pulse modulation signal with a frequency that corresponds to the summed value of 628. Thus, in contrast to some controllers which may only allow VCO 210 to output a pulse modulated signal corresponding to digital values divisible by 8 (e.g., if the filter includes a simple gain factor of 8), such as 624 or 632, controller 200 may increase the resolution of VCO 210 by outputting a pulse modulated signal at frequencies corresponding to any input value defined by the higher resolution (e.g., 2048 distinct frequencies rather than 256 distinct frequencies).

As discussed above, in some examples, power converter 104 may receive the pulse modulation signal corresponding to digital value received by VCO 210 and may change (e.g., increase) the output voltage $V_{OUT}$ based on the pulse modulation signal. In some examples, PID controller 202 may receive the increased output voltage $V_{OUT}$, determine a new (e.g., lower) error amount, and output an updated (e.g., lower) feedback voltage $V_{FB}$ based on the updated error amount. ADC 206 may receive the updated, lower feedback voltage and may output a new digital value based on the feedback voltage $V_{FB}$. SPIR low-pass filter 208 may determine a filtered digital value based on the digital value from ADC 206 and may output the filtered digital value to VCO 210. In this way, SPIR low-pass filter 208 may output a digital value defined by a higher resolution that ADC 206, which may enable VCO 210 to increase the resolution of the pulse modulated signal output by VCO 210, which may provide finer control of power converter 104.

In some examples, SPIR low-pass filter 208 may improve performance of power converter 104 and/or controller 106. For example, SPIR low-pass filter 208 may have a very low pole frequency which may effectively create additional bits. For instance, for a 32 microsecond rate and a 60 Hertz filter cutoff, the SPIR low-pass filter may effectively create 9 additional bits. In some instances, because the pole frequency is within the PID controller bandwidth, the additional bits may be compensated by the PID controller amplifier gain, which may increase the accuracy of the PID controller. In some examples, SPIR low-pass filter 208 may have a high DC gain which may attenuate low frequency content at the ADC input, which may leave more bits usable for AC regulation. In some examples, SPIR low-pass filter 208 may have a unity gain at high frequencies which may cause the phase lag to converge to zero.

Figure 3:
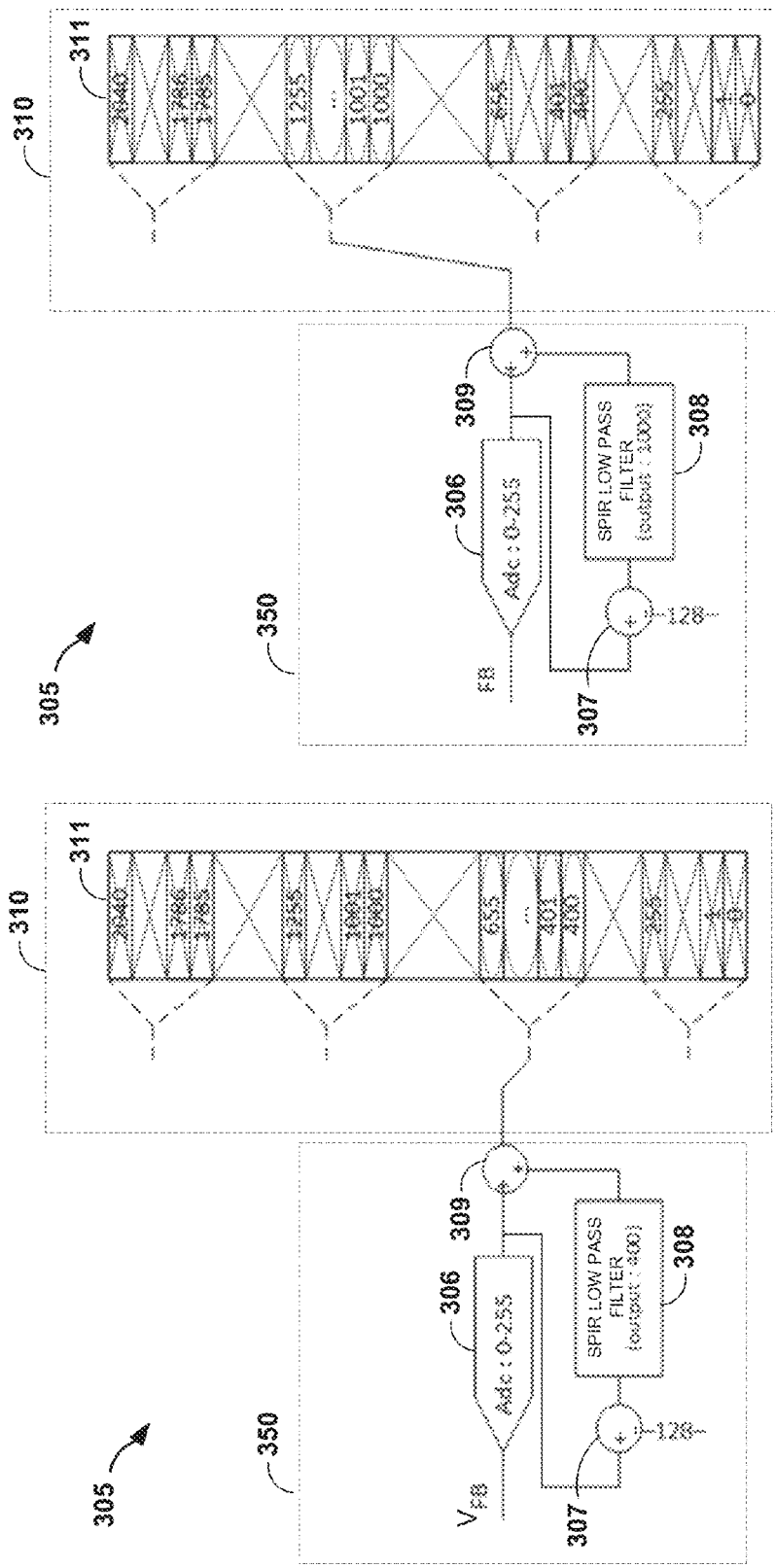
FIGS. 3A-3B are conceptual and block diagrams illustrating an example controller of a power converter in accordance with one or more aspects of this disclosure.

FIGS. 3A-3B are conceptual and block diagrams illustrating an example controller 305 of a power converter in accordance with one or more aspects of this disclosure. In some examples, controller 305 may include SPIR device 350 and VCO 310. SPIR device 350 may include analog-to-digital converter (ADC) 306, bit adder 307, digital set point independent regulation (SPIR) filter 308, and bit adder 309.

In some examples, ADC 306 may correspond to ADC 206 described with reference to FIG. 2. ADC 306 may receive a feedback voltage $V_{FB}$ (e.g., from PID controller 202). In some examples, ADC 306 may convert the feedback voltage $V_{FB}$ to an unfiltered digital value indicative of the feedback voltage $V_{FB}$, where the digital value is defined by a first resolution. For example, if ADC 306 includes an 8-bit ADC, a first resolution may equal 256 distinct values. ADC 306 may convert the feedback voltage $V_{FB}$ to an unfiltered digital value defined by the first resolution (e.g., a digital value between 0 and 255), and may output the unfiltered digital value defined by the first resolution.

Bit adder 307 may correspond to bit adder 207 described with reference to FIG. 2. Bit adder 307 may receive the unfiltered digital value from ADC 306 at a positive terminal and a predetermined value at a negative terminal. In some instances, the predetermined value equals one half of a number of distinct values of the ADC (e.g., for an 8-bit ADC, the predetermined value may equal 128). Bit adder 307 may determine the difference between the value received at the positive (or non-inverting) terminal and the value received at the negative (or inverting) terminal, and may output a value indicative of the difference to SPIR low-pass filter 308.

In some examples, SPIR low-pass filter 308 may correspond to SPIR low-pass filter 108 as described with reference to FIG. 1 and/or SPIR low-pass filter 208 described with reference to FIG. 2. SPIR low-pass filter 308 may output a digital value defined by a second resolution based on the value received from bit adder 307.

As illustrated in FIG. 3A, controller 305 may operate in a steady state, where bit adder 307 outputs a digital value equal to 0 and SPIR low-pass filter 308 outputs a digital value of 400. If a load consumes additional power, a PID controller (e.g., PID controller 202 of FIG. 2) may increase the feedback voltage $V_{FB}$ to ADC 306, which may cause the value output by ADC 206 to increase from a first value (e.g., 128) to a second value (e.g., 255). In this example, the digital value output by bit adder 307 may increase from 0 to 127. Responsive to receiving a new value from bit adder 307, SPIR low-pass filter 308 may determine the value received from bit adder 307 satisfies a first condition. SPIR low-pass filter 308 may determine that the first condition is satisfied because the digital value received from bit adder 307 is greater than zero. Responsive to determining that the first condition is satisfied, SPIR low-pass filter 308 may incrementally increase the filtered digital value from 400 to a higher value. As SPIR low-pass filter 308 increases the filtered digital value, VCO 210 may adjust the frequency of the pulse modulated signal output to the power converter, which may cause the power converter to increase the output voltage $V_{OUT}$.

In some examples, bit adder 309 may sum the filtered digital value output by SPIR low-pass filter 308 and the unfiltered digital value output by ADC 306, and may output a digital value indicative of the sum. VCO 310 may receive the summed digital value output by bit adder 309 and may output, based on the summed digital value, a pulse modulated signal defined by the second resolution. For example, VCO 310 may receive a digital value within a range of summed digital values 311. Each distinct input value within the range of summed digital values may correspond to a respective distinct frequency of the pulse modulated signal. Responsive to receiving a summed digital value within the range of digital values 311 defined by the second resolution, VCO 310 may output a corresponding pulse modulated signal with a frequency defined by the second resolution. Thus, as SPIR low-pass filter 308 increases the filtered digital value from 400 to a higher value, VCO 310 may adjust the frequency of the pulse modulated signal to control the output voltage $V_{OUT}$ output by the power converter.

As the power converter adjusts (e.g., increases) the output voltage $V_{OUT}$, the error amount between the output voltage $V_{OUT}$ may decrease. A PID controller may continue to output a high feedback voltage $V_{FB}$ such that the digital value output by ADC 306 remains high (e.g., 255). Thus, SPIR low-pass filter 308 may continue to increase to filtered digital value, which in turn causes VCO 310 to adjust the pulse modulated signal, causing the power converter to increase the output voltage $V_{OUT}$. As the output voltage $V_{OUT}$ approaches the reference voltage, the PID controller may decrease the feedback voltage in order to avoid overshooting the reference voltage. As feedback voltage $V_{FB}$ decreases, the unfiltered digital value output by ADC 306 may incrementally decrease from 255 to 128. When the digital value output by ADC 306 reaches 128, bit adder 307 may output a value of 0. Responsive to receiving a digital value equal to zero from bit adder 307, SPIR low-pass filter 308 may determine that the digital value received from bit adder 307 does not satisfy the first condition (e.g., the digital value is not greater than zero) and may stop increasing the filtered digital value. Thus, as illustrated in FIG. 3B, the controller may settle at a new steady state where the digital value output by ADC 306 equals 128 and the filtered digital value output by SPIR low-pass filter 308 equals 1000.

Figure 4:
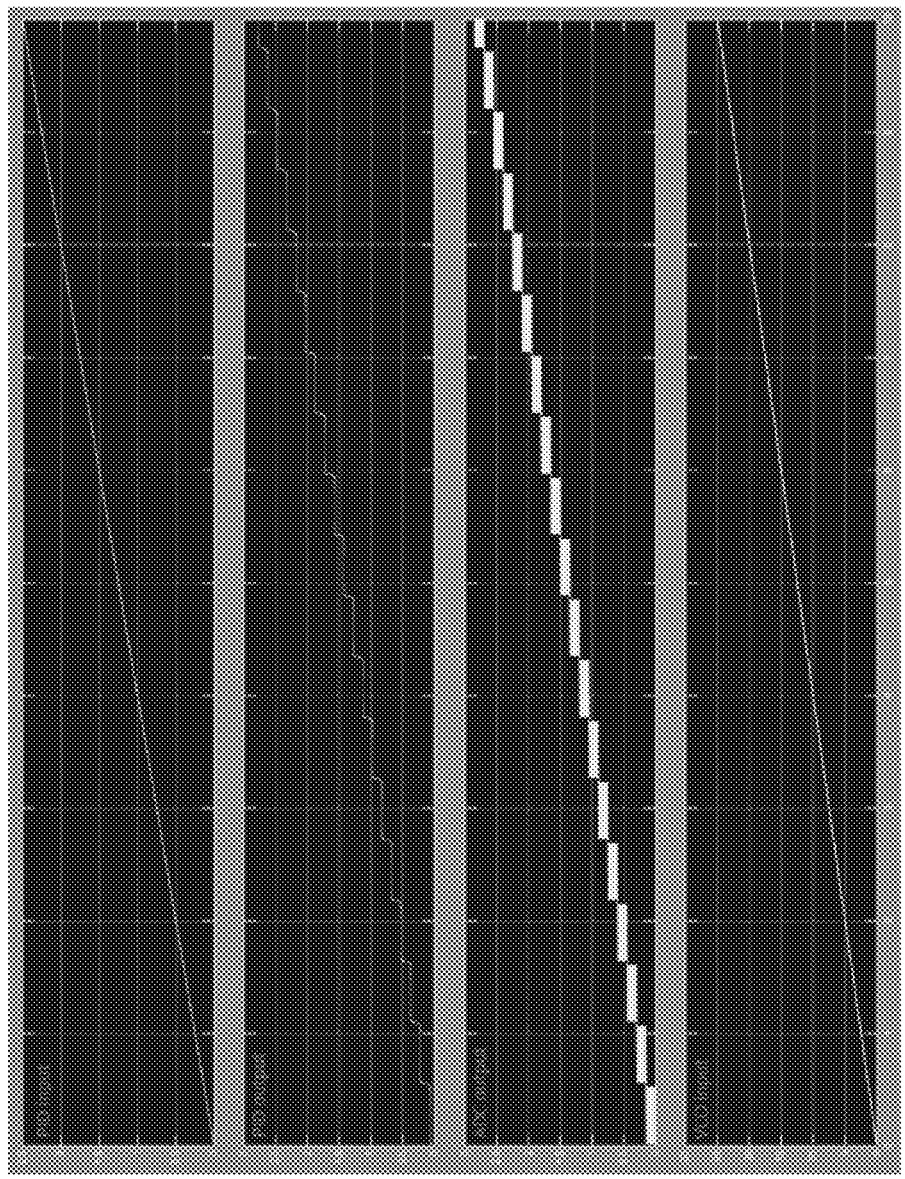
FIG. 4 is a graph that illustrates example waveforms for an input voltage.

FIG. 4 is a graph that illustrates simulated results for an example controller operating in an example implementation, in accordance with one or more aspects of this disclosure. Section 402 shows the input voltage to PID controller 202, section 404 shows the voltage output by PID controller 202, section 406 shows the digital value output by ADC 206, and section 408 shows the digital value received by VCO 210 from SPIR low-pass filter 208. As illustrated by section 402 of FIG. 4, the input voltage to PID controller 202 increases smoothly. As shown by section 404 and 406 of FIG. 4, the output from PID controller 202 and the output from ADC 206 is not represented by a smooth line. Rather, the PID output and the ADC output appear to increase in steps. However, as illustrated by section 408 of FIG. 4, SPIR low-pass filter 308 increases the resolution of the filtered digital value so that the input received by VCO 310 increases linearly rather than in steps.

Figure 5:
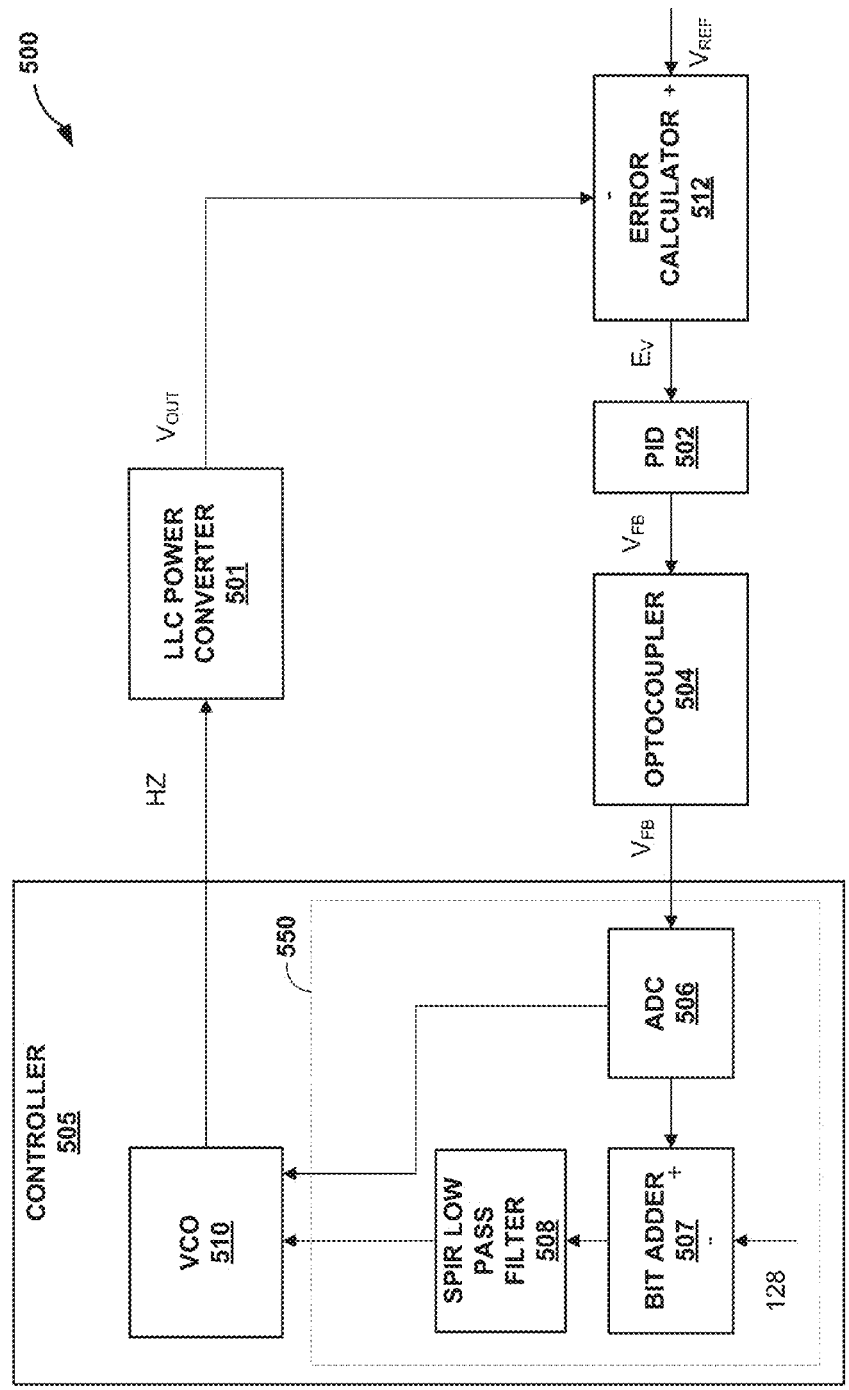
FIG. 5 is a block diagram illustrating an example system for converting power from a power source, in accordance with one or more aspects of this disclosure.

FIG. 5 is a block diagram illustrating a system 500 for converting power, in accordance with one or more aspects of this disclosure. FIG. 5 shows system 500 as having five separate and distinct components shown as LLC power converter 501, PID controller 502, optocoupler 504, controller 505, and error calculator 512, however system 500 may include additional or fewer components. For instance, LLC power converter 501, PID controller 502, optocoupler 504, controller 505, and error calculator 512 may be five individual components or may represent a combination of one or more components that provide the functionality of system 500 as described herein. In some examples, LLC power converter 501, PID controller 502, and optocoupler 504 may correspond to power converter 104 of FIG. 1. PID controller 202 of FIG. 2, and optocoupler 204 of FIG. 2, respectively.

Error calculator 512 may receive an output voltage $V_{OUT}$ from LLC power converter 501 and a reference voltage $V_{REF}$. Error calculator 512 may determine an error amount Ev indicative of the difference between the output voltage $V_{OUT}$ and the reference nominal) voltage $V_{REF}$. Error calculator 512 may output an indication of the voltage error Ev, which may be received by PID controller 502. PID controller 502 may determine a feedback voltage $V_{FB}$ based on the voltage error Ev. For example, PID controller 502 may perform a proportional, integral, and/or derivative calculation ("PID calculations") to the voltage error to generate feedback voltage $V_{FB}$. PID controller 512 may output the feedback voltage $V_{FB}$. Optocoupler 504 may receive the feedback voltage $V_{FB}$ from PID controller 502. Optocoupler 504 may electrically isolate the feedback voltage $V_{FB}$ from LLC power converter 501. For example, optocoupler 504 may convert the feedback voltage $V_{FB}$ to light (e.g., by an LED) and convert the light back to the feedback voltage $V_{FB}$ (e.g., by a phototransistor). Optocoupler may output the feedback voltage $V_{FB}$ to controller 505.

In some examples, controller 505 may include a SPIR device 550 and VCO 510. SPIR device 550 may include ADC 506, bit adder 507, and SPIR low-pass filter 508. ADC 506, bit adder 507, SPIR low-pass filter 508, and VCO 510 may correspond to ADC 206, bit adder 207, SPIR low-pass filter 208, and VCO 210, as described with reference to FIG. 2, respectively. ADC 506 may receive the feedback voltage $V_{FB}$ and may convert the feedback voltage $V_{FB}$ to an unfiltered digital value defined by a first resolution. For example, if ADC 506 includes an 8-bit ADC, the first resolution may include 256 distinct values. In some examples, ADC 506 may output the unfiltered digital value to bit adder 507. In some examples, bit adder 507 may receive the unfiltered digital value from ADC 506 at a positive (e.g., non-inverting) terminal. Bit adder 507 may receive a predetermined digital value at a negative (e.g., inverting) terminal. The predetermined digital value may be equal to one half of the number of distinct values that can be output by ADC 506. For example, if ADC 506 is an 8-bit ADC (e.g., ADC 506 is defined by a resolution of 256 distinct values), bit adder 507 may receive a predetermined value of 128 at the inverting input. Bit adder 507 may determine the difference between the unfiltered digital value received from ADC 506 and the predetermined value, and may output a new digital value indicative of the difference between the received values.

In some examples, SPIR low-pass filter 508 may receive the output from bit adder 507 and may output a filtered digital value based on the received digital value. In some examples, SPIR low-pass filter 508 may apply a gain to the received digital value. For example, SPIR low-pass filter 508 may have a gain larger than unity at low frequencies and a unity gain at high frequencies. SPIR low-pass filter 508 may output a filtered digital value defined by a second resolution. For example, if the second resolution equals 2048, SPIR low-pass filter 508 may output a digital value at any of the 2048 distinct values.

In some examples, SPIR low-pass filter 508 may adjust the digital value in response to determining that the digital value received from bit adder 507 satisfies a first condition or a second condition. SPIR low-pass filter 508 may determine that the digital value received from bit adder 507 satisfies a first condition if the received digital value is greater than zero. In some examples, responsive to determining that the received digital value satisfies a first condition (e.g., is greater than zero). SPIR low-pass filter 508 may filter the received digital value by increasing the digital value, and may output the filtered digital value.

Similarly, SPIR low-pass filter 508 may determine that the digital value received from bit adder 507 satisfies a second condition if the received digital value is less than zero. In some examples, responsive to determining that the received digital value satisfies the second condition (e.g., is less than zero), SPIR low-pass filter 508 may adjust the digital value by decreasing the digital value, and may output the filtered digital value. After filtering the digital value, SPIR low-pass filter 508 may output the filtered digital value to VCO 510.

VCO 510 may receive one or more digital values and may output, based on the one or more received digital value, a pulse modulated signal with a frequency defined by the second resolution. For example, VCO 510 may receive the filtered digital value from SPIR low-pass filter 508 and the unfiltered digital value from ADC 506 and may sum the received digital values to generate a summed digital value. For instance, if SPIR low-pass filter 508 outputs a filtered digital value equal to 400 and ADC 506 outputs an unfiltered digital value equal to 128, the summed digital value will be equal to 526. In some examples, each summed digital value corresponds to a distinct frequency of the pulse modulated signal. For instance, VCO 510 may be capable of outputting a pulse modulated signal at any of 2048 distinct frequencies and may output a pulse modulated signal that has a frequency corresponding to the combined digital value. VCO 510 may output the pulse modulated signal with the particular frequency to LLC power converter 501 in order to control the output of LLC power converter 501.

LLC power converter 501 may regulate the output voltage $V_{OUT}$ based on the pulse modulated signal. Responsive to power converter 501 outputting a different output voltage $V_{OUT}$, PID controller 502 may output a different feedback voltage $V_{FB}$, which may cause ADC 506 to output a different digital value. SPIR low-pass filter 508 may continue to adjust the filtered digital value output by SPIR low-pass filter 508 until ADC 506 reaches a steady state. Bit adder 507 may indicate that ADC 506 has reached a steady state when the value output by bit adder 507 equals zero. In other words, at the steady state, ADC 506 operates at half of the range of ADC 506, and the digital value of ADC 506 is independent of the set point voltage. At the steady state, SPIR low-pass filter 508 may output the steady state filtered digital value. Small drift may exist in the filtered digital value. In some instances, the drift may be approximately equal to SPIR low-pass filter current output divided by the gain of the SPIR low-pass filter, where the gain is measured at low frequency. For instance, if the SPIR low-pass filter is at 400 and the gain is 10, then the drift is 400 divided by ten, which is equal to 40.

Figure 6:
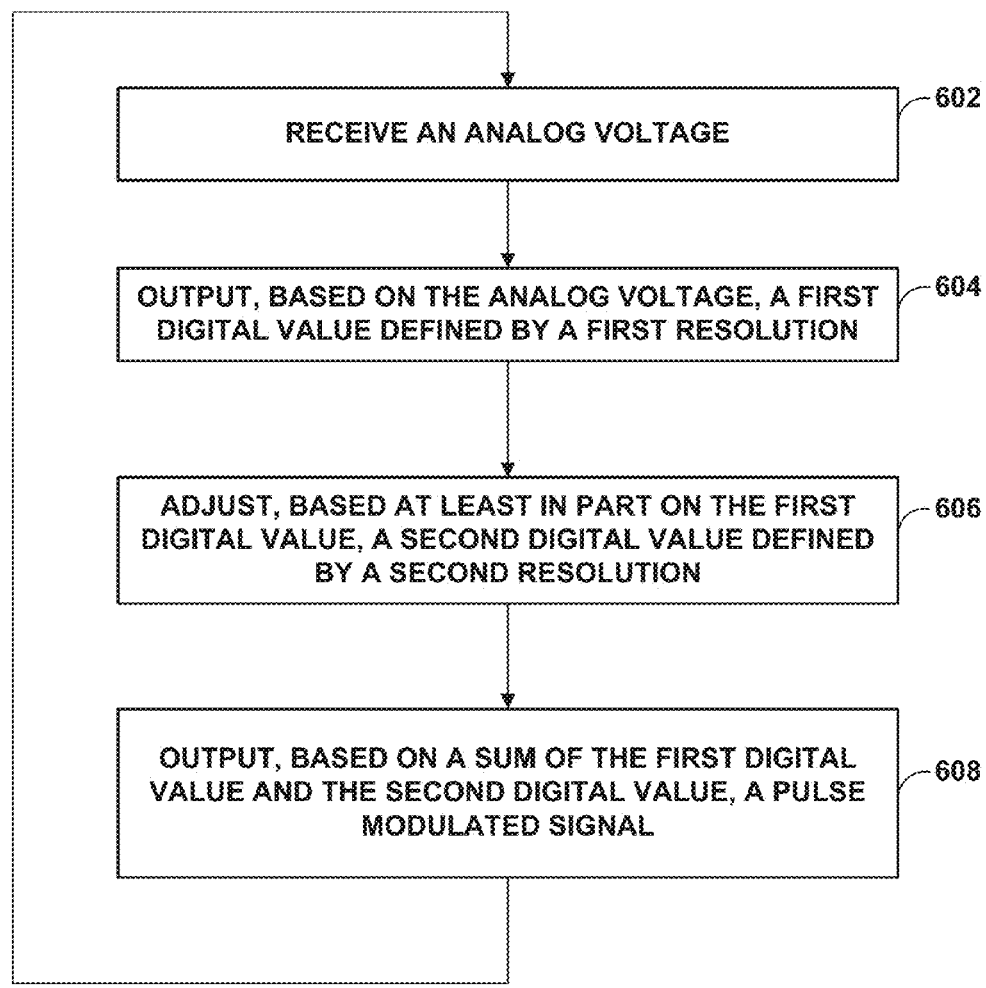
FIG. 6 is a flowchart illustrating an example method for operations of an example controller, in accordance with one or more aspects of this disclosure.

FIG. 6 is a flowchart illustrating an example method for controlling a power converter, in accordance with one or more aspects of this disclosure. For purposes of illustration only, the example operations are described below within the context of controller 205 as shown in FIG. 2.

In some examples, ADC 206 may receive an analog voltage (602). For example, ADC 206 may receive feedback voltage $V_{FB}$ from PID controller 202 (e.g., via optocoupler 204). ADC 206 may output, based on the received feedback voltage $V_{FB}$, a first, unfiltered digital value defined by a first resolution (604). In some examples, the resolution of an N-bit ADC may be defined by $2^N$ distinct values. For instance, if ADC 206 includes an 8-bit ADC, the resolution of the first digital value may include 256 distinct digital values (e.g., 0-255).

In some examples SPIR low-pass filter 208 may adjust, based at least in part on the first digital value, a second, filtered digital value defined by a second resolution that is different from the first resolution (606). In some examples, the second resolution may include 2048 distinct values. It is to be understood that the first resolution and the second resolution may include any number of distinct values and that the number of distinct values discussed herein are merely examples. SPIR low-pass filter 208 may receive a digital value from bit adder 207 that is indicative of a difference between the first, unfiltered digital value output ADC 206 and a third, predetermined digital value. The predetermined digital value may be equal to one half of the number of distinct values that may be output by ADC 206. SPIR low-pass filter 208 may adjust the second digital value, also referred to as a filtered digital value, if the digital value received from hit adder 207 satisfies a first condition (e.g., the digital value received from bit adder 207 is greater than zero or a second condition (e.g., the digital value received from hit adder 207 is less than zero). In some examples, in response to determining the first condition is satisfied. SPIR low-pass filter 208 may adjust the second digital value by increasing the second digital value. In some examples, in response to determining the second condition is satisfied, SPIR low-pass filter 208 may adjust the second digital value by decreasing the second digital value. SPIR low-pass filter 208 may output the second digital value.

In some examples, VCO 210 may output, based on a sum of the first digital value output by ADC 206 and the second digital value output by SPIR low-pass filter 208, a pulse modulated signal (608). In some examples, VCO 210 may receive the first digital value and the second digital value and may sum the received digital values. In some instances, VCO 210 may receive a single digital value that represents that sum of the first digital value and the second digital value. VCO 210 may output a pulse modulated signal defined by the second resolution. For instance, VCO 210 may output a distinct pulse modulated signal for each of the distinct summed digital values. In other words, the sum of the digital values output by ADC 206 and the digital values output by SPIR low-pass filter 208 may represent 2048 possible distinct digital values, and VCO 210 may output a pulse modulated signal at 2048 distinct frequencies, where each distinct summed digital value corresponds to a respective, distinct frequency. In this way, STIR low-pass filter 208 may enable controller 205 to increase the resolution of VCO 210.

The following numbered examples may illustrate one or more aspects of the disclosure:

EXAMPLE 1

A controller for controlling a power converter, the controller comprising: an analog-to-digital converter (ADC) configured to output, based on a received analog voltage, a first digital value defined by a first resolution; a digital filter configured to adjust, based at least in part on the first digital value, a second digital value, wherein the second digital value is defined by a second resolution different from the first resolution; and a pulse modulation device configured to output, based on a sum of the first digital value and the second digital value, a pulse modulated signal, wherein a frequency of the pulse modulated signal is defined by the second resolution.

EXAMPLE 2

The controller of example 1, further comprising: a hit adder configured to determine a difference between the first digital value and a predetermined third digital value, wherein the digital filter is configured to adjust the second digital value based on the difference between the first digital value and the predetermined digital value.

EXAMPLE 3

The controller of example 2, wherein the predetermined digital value is equal to one half of a number of distinct values of the ADC.

EXAMPLE 4

The controller of any combination of examples 2-3, wherein the digital filter is configured to adjust the second digital value by at least being configured to: responsive to determining that the difference between the first digital value and the predetermined digital value satisfies a first condition, increase the second digital value.

EXAMPLE 5

The controller of any combination of examples 2-4, wherein the digital filter is configured to adjust the second digital value by at least being configured to: responsive to determining that the difference between the first digital value and the predetermined digital value satisfies a second condition, decrease the second digital value.

EXAMPLE 6

The controller of any combination of examples 1-5, wherein the analog voltage received by the ADC comprises a first feedback voltage indicative of a second feedback voltage generated by a proportional-integral-derivative (PID) controller.

EXAMPLE 7

The controller of any combination of examples 1-6, wherein the digital filter comprises a low-pass filter defined by: a gain larger than unity when a frequency of the pulse modulated signal is less than a first threshold frequency; and a unity gain when the frequency of the pulse modulated signal is greater than a second threshold frequency.

EXAMPLE 8

A method for controlling a power converter, the method comprising: receiving, by an analog-to-digital converter (ADC), an analog voltage; outputting, by the ADC, a first digital value defined by a first resolution; adjusting, by a digital filter, based at least in part on the first digital value, a second digital value, wherein the second digital value is defined by a second resolution different from the first resolution; outputting, by the digital filter, the second digital value; and outputting, by a pulse modulation device, based on a sum of the first digital value and the second digital value, a pulse modulated signal, wherein a frequency of the pulse modulated signal is defined by the second resolution.

EXAMPLE 9

The method of example 8, further comprising: determining, by a bit adder, a difference between the first digital value and a predetermined digital value,
wherein adjusting the second digital value is further based on the difference between the first digital value and the predetermined digital value.

EXAMPLE 10

The method of example 9, wherein the predetermined digital value is equal to one half of a number of distinct values of the ADC.

EXAMPLE 11

The method of any combination of examples 9-10, wherein adjusting the second digital value comprises: responsive to determining that the difference between the first digital value and the predetermined digital value satisfies a first condition, increasing, by the digital filter, the second digital value.

EXAMPLE 12

The method of any combination of examples 9-11, wherein adjusting the second digital value comprises: responsive to determining that the difference between the first digital value and the predetermined digital value satisfies a second condition, decreasing, by the digital filter, the second digital value.

EXAMPLE 13

The method of any combination of examples 8-12, wherein receiving the analog voltage comprises receiving, by the ADC, a first feedback voltage indicative of a second feedback voltage generated by a proportional-integral-derivative (PID) controller.

EXAMPLE 14

A system comprising: a power converter configured to regulate an output voltage; and a controller for controlling the power converter, the controller comprising: an analog-to-digital converter (ADC) configured to output, based on a received analog voltage, a first digital value defined by a first resolution; a digital filter configured to adjust, based at least in part on the first digital value, a second digital value, wherein the second digital value is defined by a second resolution different from the first resolution; and a pulse modulation device configured to output, based on a sum of the first digital value and the second digital value, a pulse modulated signal, wherein a frequency of the pulse modulated signal is defined by the second resolution, wherein the power converter is configured to regulate the output voltage based on the pulse modulated signal output by the pulse modulation device.

EXAMPLE 15

The system of example 14, wherein the controller further comprises:
a hit adder configured to determine a difference between the first digital value and a predetermined third digital value, wherein the digital filter is configured to adjust the second digital value based on the difference between the first digital value and the predetermined digital value.

EXAMPLE 16

The system of example 15, wherein the predetermined digital value is equal to one half of a number of distinct values of the ADC.

EXAMPLE 17

The system of any combination of examples 15-16, wherein the digital filter is configured to adjust the second digital value by at least being configured to: responsive to determining that the difference between the first digital value and the predetermined digital value satisfies a first condition, increase the second digital value.

EXAMPLE 18

The system of any combination of examples 15-17, wherein the digital filter is configured to adjust the second digital value by at least being configured to: responsive to determining that the difference between the first digital value and the predetermined digital value satisfies a second condition, decrease the second digital value.

EXAMPLE 19

The system of any combination of examples 14-18, further comprising a proportional-integral-derivative (PID) controller configured to: determine a feedback voltage based on, at least in part, the output voltage output by the power converter; and output the feedback voltage, wherein the analog voltage received by the ADC comprises the feedback voltage.

EXAMPLE 20

The system of any combination of examples 14-19, wherein the digital filter comprises a low-pass filter defined by: a gain larger than unity when a frequency of the pulse modulated signal is less than a first threshold frequency; and a unity gain when the frequency of the pulse modulated signal is greater than a second threshold frequency.

The aforementioned examples are used to show examples or applications that are applicable to the techniques and circuits described herein. In one or more examples, the functions described may be implemented in hardware, software, firmware, or any combination thereof. For example, one or more of the controllers described herein implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A controller for controlling a power converter, the controller comprising:
   an analog-to-digital converter (ADC) configured to output, based on a received analog voltage, a first digital value defined by a first resolution;
   a digital filter configured to adjust, based at least in part on the first digital value, a second digital value, wherein the second digital value is defined by a second resolution different from the first resolution; and
   a pulse modulation device configured to output, based on a sum of the first digital value and the second digital value, a pulse modulated signal, wherein a frequency of the pulse modulated signal is defined by the second resolution.

2. The controller of claim 1, further comprising:
   a bit adder configured to determine a difference between the first digital value and a predetermined digital value, wherein the digital filter is configured to adjust the second digital value based on the difference between the first digital value and the predetermined digital value.

3. The controller of claim 2, wherein the predetermined digital value is equal to one half of a number of distinct values of the ADC.

4. The controller of claim 2, wherein the digital filter is configured to adjust the second digital value by at least being configured to:
   responsive to determining that the difference between the first digital value and the predetermined digital value satisfies a first condition, increase the second digital value.

5. The controller of claim 2, wherein the digital filter is configured to adjust the second digital value by at least being configured to:
   responsive to determining that the difference between the first digital value and the predetermined digital value satisfies a second condition, decrease the second digital value.

6. The controller of claim 1, wherein the analog voltage received by the ADC comprises a first feedback voltage indicative of a second feedback voltage generated by a proportional-integral-derivative (PID) controller.

7. The controller of claim 1, wherein the digital filter comprises a low-pass filter defined by:
   a gain larger than unity when a frequency of the pulse modulated signal is less than a first threshold frequency; and
   a unity gain when the frequency of the pulse modulated signal is greater than a second threshold frequency.

8. A method for controlling a power converter, the method comprising:
   receiving, by an analog-to-digital converter (ADC), an analog voltage;
   outputting, by the ADC, a first digital value defined by a first resolution;
   adjusting, by a digital filter, based at least in part on the first digital value, a second digital value, wherein the second digital value is defined by a second resolution different from the first resolution;
   outputting, by the digital filter, the second digital value; and outputting, by a pulse modulation device, based on a sum of the first digital value and the second digital value, a pulse modulated signal, wherein a frequency of the pulse modulated signal is defined by the second resolution.

9. The method of claim 8, further comprising:
determining, by a bit adder, a difference between the first digital value and a predetermined digital value,
wherein adjusting the second digital value is further based on the difference between the first digital value and the predetermined digital value.

10. The method of claim 9, wherein the predetermined digital value is equal to one half of a number of distinct values of the ADC.

11. The method of claim 9, wherein adjusting the second digital value comprises:
responsive to determining that the difference between the first digital value and the predetermined digital value satisfies a first condition, increasing, by the digital filter, the second digital value.

12. The method of claim 9, wherein adjusting the second digital value comprises:
responsive to determining that the difference between the first digital value and the predetermined digital value satisfies a second condition, decreasing, by the digital filter, the second digital value.

13. The method of claim 8, wherein receiving the analog voltage comprises receiving, by the ADC, a first feedback voltage indicative of a second feedback voltage generated by a proportional-integral-derivative (PID) controller.

14. A system comprising:
a power converter configured to regulate an output voltage; and
a controller for controlling the power converter, the controller comprising:
an analog-to-digital converter (ADC) configured to output, based on a received analog voltage, a first digital value defined by a first resolution;
a digital filter configured to adjust, based at least in part on the first digital value, a second digital value, wherein the second digital value is defined by a second resolution different from the first resolution; and
a pulse modulation device configured to output, based on a sum of the first digital value and the second digital value, a pulse modulated signal, wherein a frequency of the pulse modulated signal is defined by the second resolution,
wherein the power converter is configured to regulate the output voltage based on the pulse modulated signal output by the pulse modulation device.

15. The system of claim 14, wherein the controller further comprises:
a bit adder configured to determine a difference between the first digital value and a predetermined digital value,
wherein the digital filter is configured to adjust the second digital value based on the difference between the first digital value and the predetermined digital value.

16. The system of claim 15, wherein the predetermined digital value is equal to one half of a number of distinct values of the ADC.

17. The system of claim 15, wherein the digital filter is configured to adjust the second digital value by at least being configured to:
responsive to determining that the difference between the first digital value and the predetermined digital value satisfies a first condition, increase the second digital value.

18. The system of claim 15, wherein the digital filter is configured to adjust the second digital value by at least being configured to:
responsive to determining that the difference between the first digital value and the predetermined digital value satisfies a second condition, decrease the second digital value.

19. The system of claim 14, further comprising a proportional-integral-derivative (PID) controller configured to:
determine a feedback voltage based on, at least in part, the output voltage output by the power converter; and
output the feedback voltage,
wherein the analog voltage received by the ADC comprises the feedback voltage.

20. The system of claim 14, wherein the digital filter comprises a low-pass filter defined by:
a gain larger than unity when a frequency of the pulse modulated signal is less than a first threshold frequency; and
a unity gain when the frequency of the pulse modulated signal is greater than a second threshold frequency.

* * * * *